(12) United States Patent
Nakagawa et al.

(10) Patent No.: US 11,007,689 B2
(45) Date of Patent: May 18, 2021

(54) METHOD OF MANUFACTURING IN-MOLD DECORATIVE MOLDED ARTICLE

(71) Applicant: Panasonic Intellectual Property Management Co., Ltd., Osaka (JP)

(72) Inventors: Takashi Nakagawa, Osaka (JP); Yuuki Sugino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 16/255,185

(22) Filed: Jan. 23, 2019

(65) Prior Publication Data
US 2019/0240884 A1 Aug. 8, 2019

(30) Foreign Application Priority Data

Feb. 8, 2018 (JP) .............................. JP2018-020586

(51) Int. Cl.
*B29C 45/14* (2006.01)
*B29C 45/80* (2006.01)
(Continued)

(52) U.S. Cl.
CPC .. *B29C 45/14688* (2013.01); *B29C 45/14016* (2013.01); *B29C 45/14827* (2013.01); *B29C 45/80* (2013.01); *B29C 69/001* (2013.01); *B44C 1/105* (2013.01); *B44C 1/14* (2013.01); *B29C 2045/14704* (2013.01); *B29C 2793/009* (2013.01); *B29C 2793/0027* (2013.01); *B29C 2945/76568* (2013.01); *B29C 2945/76749* (2013.01); *B29K 2905/00* (2013.01)

(58) Field of Classification Search
CPC ............................................ B29C 2045/14254
See application file for complete search history.

(56) References Cited

U.S. PATENT DOCUMENTS 7,582,246 B2 9/2009 Oofusa et al.
2001/0038493 A1* 11/2001 Watanabe ......... B29C 45/14827
359/609
(Continued)

FOREIGN PATENT DOCUMENTS

JP 2011-213022 10/2011
JP 2012-192698 10/2012
(Continued)

*Primary Examiner* — Marc C Howell
*Assistant Examiner* — John J Derusso
(74) *Attorney, Agent, or Firm* — Wenderoth, Lind & Ponack, L.L.P.

(57) ABSTRACT

A method of manufacturing an in-mold decorative molded article includes supplying an in-mold transfer foil to a metal mold, injecting and cooling a molding resin and taking out an molded article formed of the molding resin cooled and cured in the metal mold in which a clear layer and a transfer layer having a decorative figure in the in-mold transfer foil are integrated on the surface by opening the mold, molding the molded article integrally with a cutting portion not necessary for a target product inside the metal mold by the molding resin at an outer periphery of the product and arranging a boundary of a printing region of the clear layer in the in-mold transfer foil in the cutting portion so as to be larger than the outer periphery of the product.

5 Claims, 9 Drawing Sheets

(51) Int. Cl.
*B44C 1/10* (2006.01)
*B29C 69/00* (2006.01)
*B44C 1/14* (2006.01)

(56) References Cited

U.S. PATENT DOCUMENTS

2006/0172025 A1   8/2006  Oofusa et al.
2006/0222826 A1  10/2006  Hamano et al.
2012/0237726 A1   9/2012  Kaneuchi et al.

FOREIGN PATENT DOCUMENTS

| | | |
|---|---|---|
| JP | 2015-058655 | 3/2015 |
| WO | 2004/078452 | 9/2004 |
| WO | 2005/007380 | 1/2005 |

* cited by examiner

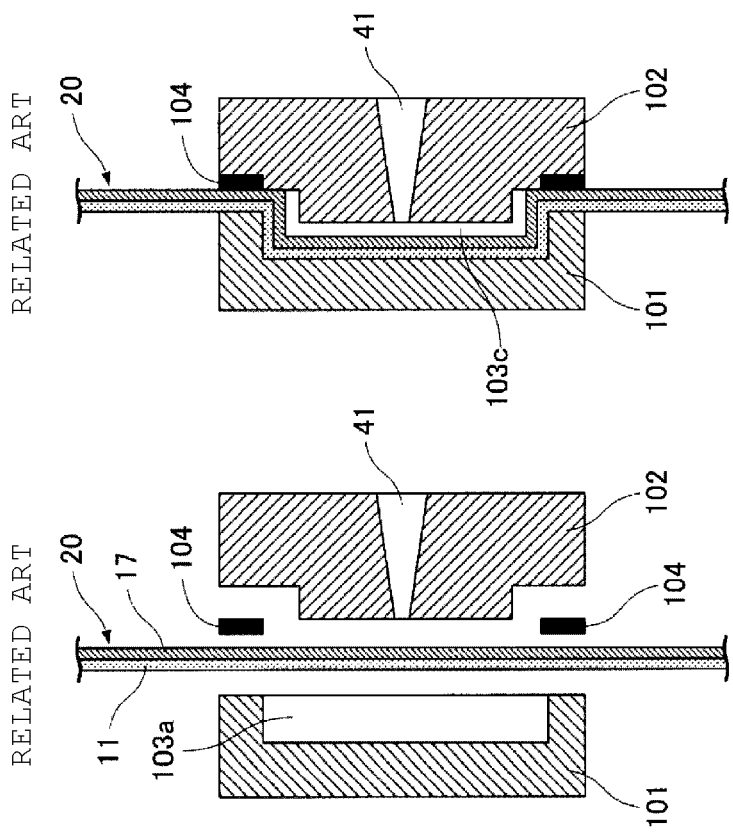

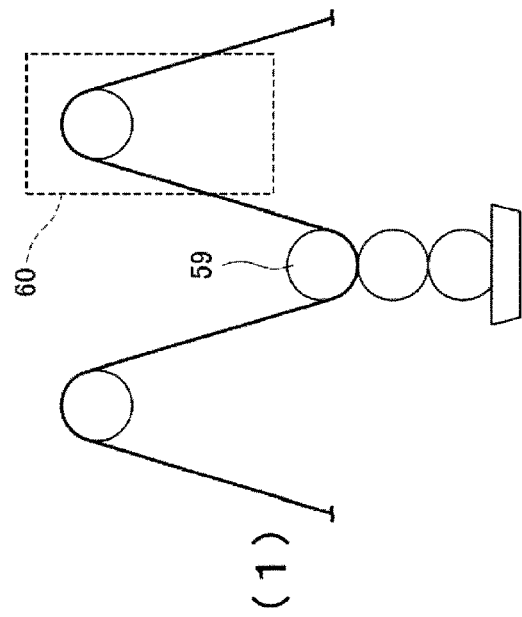
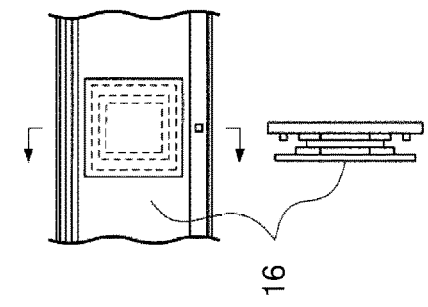
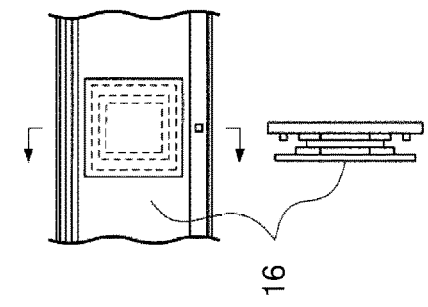
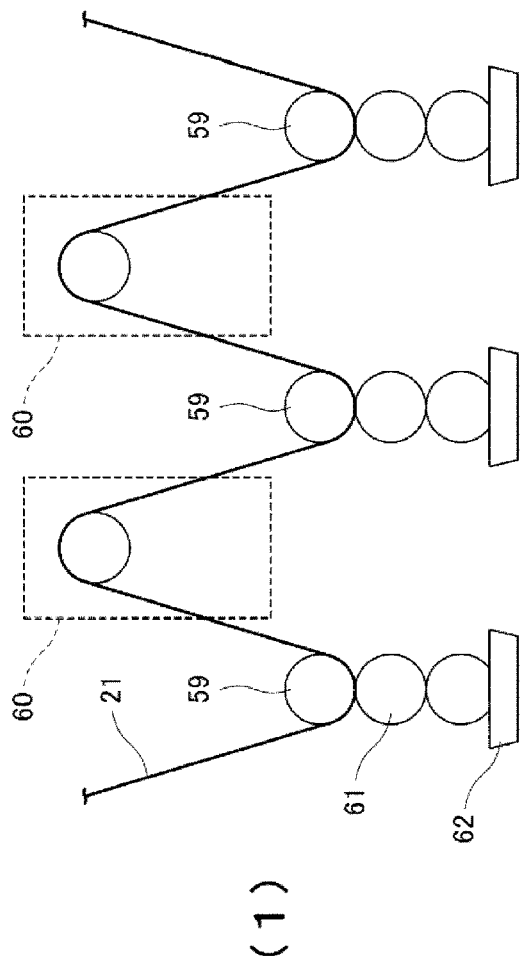
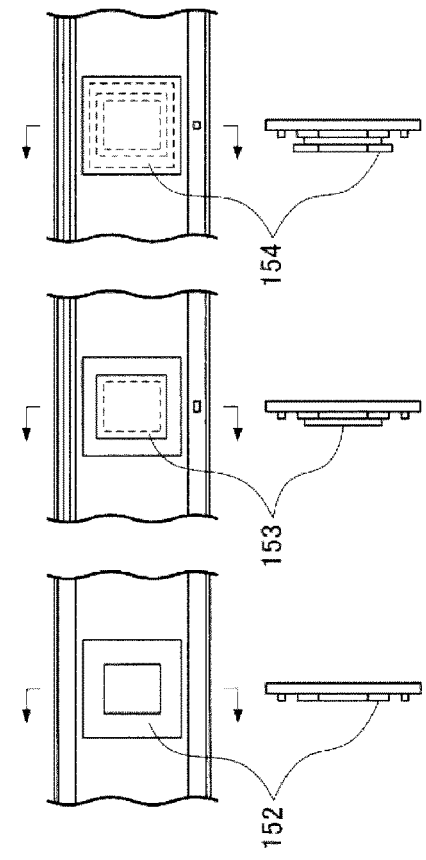
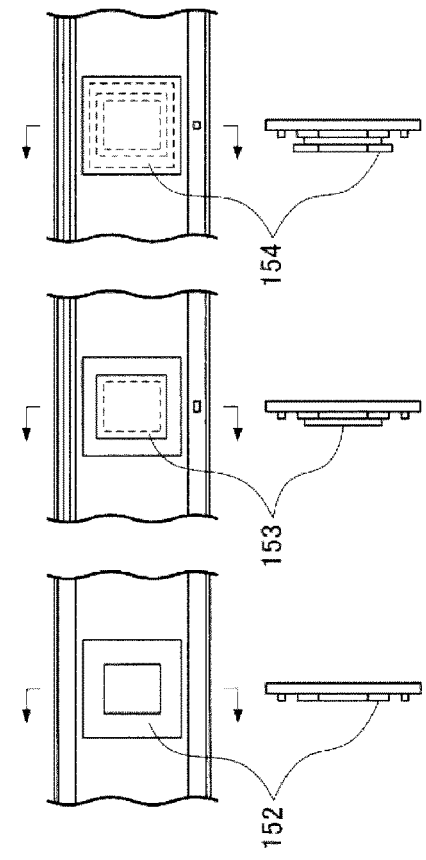
FIG. 10A PRIOR ART
FIG. 10B PRIOR ART

METHOD OF MANUFACTURING IN-MOLD DECORATIVE MOLDED ARTICLE

BACKGROUND OF THE INVENTION

1. Technical Field

The technical field relates to a method of manufacturing an in-mold decorative molded article applied to an exterior decorative molded article used for home appliances or car interior parts.

2. Description of the Related Art A Common Film in-Mold Method Will be Explained with Reference to FIGS. 7A to 7D In FIG. 7A, an in-mold transfer foil 20 in which a figure or a pattern is added is supplied between a movable mold 101 and a fixed mold 102 in an open mold state. The in-mold transfer foil 20 is formed by stacking a base material film 11 and a transfer layer 17. A decorative pattern is formed in the transfer layer 17 and the in-mold transfer foil 20 is supplied to a metal mold so that the side of the transfer layer 17 faces an injection opening 41 of the fixed mold 102.

In the in-mold transfer foil 20, a recognition sensor mark and a line mark for checking one position in a longitudinal direction of the in-mold transfer foil 20 supplied to the metal mold are provided. When the recognition sensor mark or the line mark is recognized by a CCD camera or an optical sensor and it is determined that feeding of the in-mold transfer foil 20 in the longitudinal direction reaches a target position, a clamp frame body 104 pushes the in-mold transfer foil 20 onto a part surface of the movable mold 101 to be restricted.

In FIG. 7B, the in-mold transfer foil 20 is sucked from a cavity 103a of the movable mold 101 and is shaped along a mold surface shape of the movable mold 101. After that, the movable mold 101 moves and is clamped to the fixed mold 102, and a cavity space 103c is formed between the transfer layer 17 and the fixed mold 102.

In FIG. 7C, the cavity space 103c formed between the transfer layer 17 of the in-mold transfer foil 20 shaped along the mold surface shape of the movable mold 101 and the fixed mold 102 is filled with an injection molding resin 18 via the injection opening 41. Accordingly, the transfer layer 17 and the injection molding resin 18 are joined to each other, then, the movable mold 101 and the fixed mold 102 are cooled.

In FIG. 7D, the mold is opened and a molded article 40 decorated by the transfer layer 17 on the surface is taken out. At this time, the transfer layer 17 joined to the molded article 40 is separated from the base material film 11 and is taken out from the mold. A cross-sectional view of the in-mold transfer foil 20 described in JP-A-2011-213022 and the like is shown in FIG. 8A. The transfer layer 17 is formed above the base material film 11 through a mold releasing layer 12. The transfer layer 17 includes a surface protective layer 13, a primer layer 14, a decorative layer 15 and an adhesive layer 16. A film having a layer structure in which the mold releasing layer 12, the surface protective layer 13 and the primer layer 14 are formed on the base material film 11 by using a gravure coater is called an in-mold raw fabric 21. The decorative layer 15 is formed on the in-mold raw fabric 21 by using a printer and the adhesive layer 16 is formed by using the gravure coater.

The surface protective layer 13 is formed of a hard coat material or a clear coat material, having a function of protecting the film from scratches, adhesion of dust or foreign matters.

The primer layer 14 is formed for securing interlayer adhesiveness between the surface protective layer 13 and the decorative layer 15. As the primer layer 14 has a function of sucking or fixing ink in the decorative layer 15, the primer layer 14 is not necessary when the ink itself can be directly joined to the surface protective layer 13.

The decorative layer 15 is a layer for decorating the molded article with a design, in which the layer structure varies from a single layer to multiple layers according to the structure of a pattern or a figure for adding the figure or the pattern, which is formed by gravure printing, screen printing, offset printing, ink-jet printing and so on.

The adhesive layer 16 has a role of joining the decorative layer 15 to the injection molding resin 18 and a role of protecting the ink in the decorative layer 15 so as not to be swept away by an injection resin with a high pressure.

At the time of opening the mold in FIG. 7D, the molded article 40 is separated between the mold releasing layer 12 and the surface protective layer 13, and taken out from the metal mold. In the molded article 40, the transfer layer 17 and the injection molding resin 18 are integrated, and the surface protective layer 13 is the outermost surface of the molded article 40. A cross-sectional view of a molded article in which the outermost surface is decorated with the transfer layer is shown in FIG. 8B.

In the molded article 40 used for a cover lens of a display audio panel, an article in which a liquid crystal display on a back surface is seen through the article and an article having a display of operation buttons which makes characters light up for night lighting in car interior components, polycarbonate resin having transparency is used as the injection molding resin 18.

FIG. 9 shows a design panel 50 used for a touch screen 10 described in JP-A-2015-058655. The design panel 50 is used by being arranged on a display screen 31 of a liquid crystal display 30. A touch sensor (not shown) is attached to a back surface of the design panel 50. In the design panel 50, a window part 51 which is transparent and slightly larger than the display screen 31 is formed. Accordingly, portions overlapping the window part 51 close to end portions of the display screen 31 in the liquid crystal display 30 are shielded to prevent light from leaking.

A decorative part 52 is formed around the window part 51 of the design panel 50. In the decorative part 52, a portion around the window part 51 is particularly decorated with, for example, black so as to be opaque, which makes a structure in which portions from the portion around the window part 51 to portions other than the display screen 31 of the liquid crystal display 30 are not seen from the outside. The decorative part 52 is formed simultaneously with injection molding of the design panel 50 by the film in-mold process.

SUMMARY OF THE INVENTION

However, a manufacturing error generated at the time of manufacturing the in-mold transfer foil 20 and a positioning error between the metal mold and the in-mold transfer foil 20 are generated in the film in-mold process.

In a case of the in-mold transfer foil 20 having a frame pattern as a decorative pattern as in the in-vehicle information display panel, variation in dimension of the frame pattern occurs due to variation in shrinkage of the in-mold raw fabric 21 at the time of printing the frame pattern.

In the display panel having high quality, extremely high accuracy is required for a clearance dimension between dimensions of a display part of the display and dimensions of the frame pattern of the decorative part 52. The dimension accuracy and positioning accuracy with high accuracy of ±0.2 mm or less in the frame pattern is required for being seen so as to be seamlessly connected. The in-mold transfer foil 20 used when the decorative part 52 is formed in the design panel 50 by in-mold molding is manufactured by processes shown in FIG. 10A and FIG. 10B.

FIG. 10A shows a process of printing the decorative layer 15 with respect to the in-mold raw fabric 21. (1) of an upper stage shows a process view showing gravure printing along a conveying direction of the in-mold raw fabric, (2) of a middle stage shows plan views on a lower surface of the in-mold raw fabric 21 in respective processes and (3) of a lower stage shows cross-sectional views in a width direction of the in-mold raw fabric in respective processes. The in-mold raw fabric 21 is conveyed through a plurality of conveying rollers 59, 59, . . . and drying furnaces 60, 60, . . . arranged between the rollers. Printing is performed on the in-mold raw fabric 21 during the conveyance by gravure cylinders 61 from ink pans 62 containing respective colors used for printing of the decorative part 52. Printed inks of respective colors are thermally dried by the drying furnaces 60 before next color is printed.

According to the above, the decorative layer 15 is formed layer by layer and one color by one color. Specifically, in the case of the decorative layer 15 in expression of the black frame design of the design panel 50, a clear window layer 153 is printed after a surface black frame layer 152 is printed, then, a concealed layer 154 is printed. The number of gravure rolls used at the time of printing changes according to the number of colors or the layer structure. The in-mold raw fabric 21 in which the entire decorative layer 15 has been formed is coated with the adhesive layer 16 in a process shown in FIG. 10B. The adhesive layer 16 is applied to the almost entire surface by using the gravure coater on the in-mold raw fabric 21 on which the decorative layer 15 is formed and is dried in the drying furnace 60.

As described above, the in-mold transfer foil 20 is manufactured while passing through the drying furnaces 60 in each formation of the printing layer and while generating film shrinkage due to thermal drying until the final process of the adhesive layer 16, therefore, variation in film shrinkage in the final state easily occurs, and variation from the set printing dimensions in print data is large, which increases variation in frame dimensions at the time of finishing.

Accordingly, in order to produce a design in which end portions of the decorative part 52 do not conceal the display screen 31, it is necessary to set frame dimensions to be larger than dimensions of the display screen 31 in consideration of an error in the frame dimensions due to variation of shrinkage in the printing process, an error in the frame position due to variation in positioning between the in-mold transfer foil and the metal mold in the film in-mold process and an error in frame dimensions due to deformation of a pattern caused by a stretching state of the in-mold transfer foil in the suction process of the in-mold transfer foil to the metal mold in the film in-mold process. Accordingly, there is a problem in that setting of a clearance between the display part of the display and the frame end portions of the decorative part 52 is increased and it is difficult to manufacture a decorative molded article having the design with seamless connection.

The present disclosure has been made for solving the above related-art problems and an object thereof is to provide a method of manufacturing an in-mold decorative molded article capable of transferring a decorative pattern with target dimensions in a target position of the decorative molded article.

A method of manufacturing an in-mold decorative molded article according to the present disclosure includes the steps of supplying an in-mold transfer foil to a metal mold, in which a clear layer having transparency and lower extensibility than a base material film is formed in the first layer on an in-mold raw fabric configured by forming a mold releasing layer and a primer layer on the base material film and a decorative pattern is printed in the second and subsequent layers on the in-mold raw fabric, clamping the metal mold, injecting and cooling a molding resin and taking out a molded article formed of the molding resin cooled and cured in the metal mold in which the clear layer and a transfer layer having the decorative pattern in the in-mold transfer foil are integrated on the surface by opening the mold, molding the molded article integrally with a cutting portion not necessary for a target product inside the metal mold by the molding resin at an outer periphery of the product and arranging a boundary of a printing region of the clear layer in the in-mold transfer foil in the cutting portion so as to be larger than the outer periphery of the product.

According to the above structure, the in-mold transfer foil having a decorative pattern with highly accurate dimensions can be formed, and it is possible to provide an in-mold transfer decorative molded article having high designability by performing a film in-mold method.

BRIEF DESCRIPTION OF THE DRAWINGS

FIG. 7A to 7D are manufacturing process views of an in-mold decorative molded article using a related-art in-mold transfer foil;

FIGS. 10A and 10B are manufacturing process views of an in-mold transfer foil by gravure printing.

DESCRIPTION OF EMBODIMENTS

Figure 1:
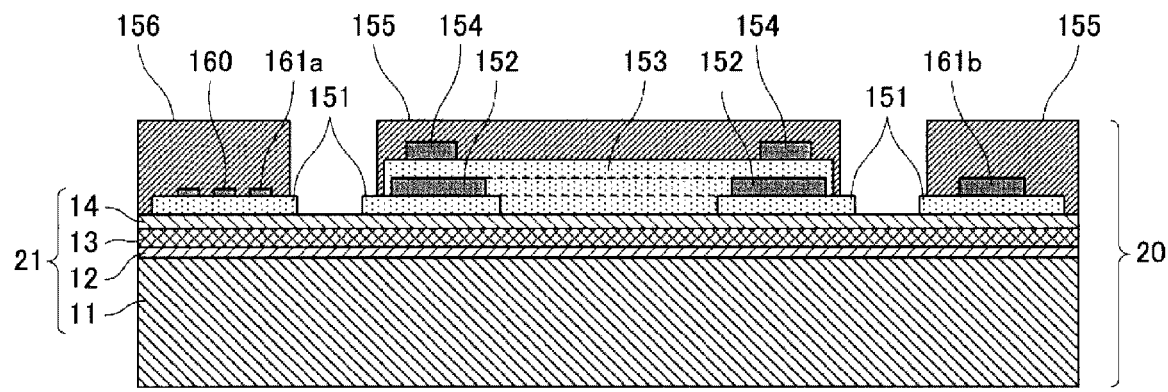
FIG. 1 is a cross-sectional view of an in-mold transfer foil used for a method of manufacturing an in-mold decorative molded article according to the present disclosure.

Hereinafter, a method of manufacturing an in-mold decorative molded article according to an embodiment of the present disclosure will be explained.

The explanation will be made by adding the same reference numerals to components having the same operations as those shown in FIGS. 7A to 7D to FIG. 9.

Figure 2:
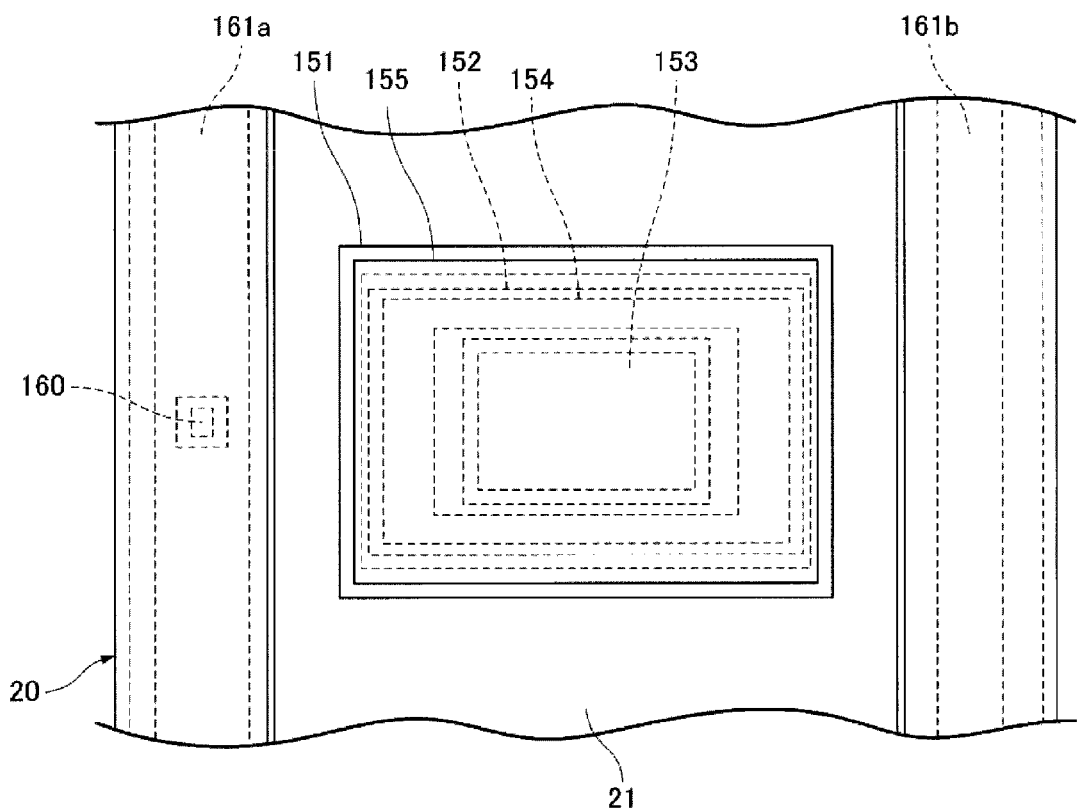
FIG. 2 is a front view of the in-mold transfer foil used for the method of manufacturing the in-mold decorative molded article according to the present disclosure.

FIG. 1 shows an enlarged cross section in a width direction of in the in-mold transfer foil 20 used for the method of manufacturing the in-mold decorative article according to the present disclosure. FIG. 2 shows a front view thereof.

In the in-mold transfer foil 20, the mold releasing layer 12, the surface protective layer 13 and the primer layer 14 are formed on the base material film 11 to thereby configure the in-mold raw fabric 21. The mold releasing layer 12, the surface protective layer 13 and the primer layer 14 are formed by coating processes such as gravure coating or slot die coating.

As a material for the base material film 11, PET (Polyethylene Terephthalate) is chiefly used, but the base material film 11 may be formed by using PC (Poly Carbonate), OPP (Oriented Polypropylene) or the like. A thickness of the layer is set to 10 μm or more to 200 μm or less. When the thickness is small, the layer is easily broken at the time of extension. Conversely, the layer is difficult to be deformed when the thickness is large. Therefore, it is optimum that a film with thickness of 20 μm or more to 100 μm or less is used.

The mold releasing layer 12 is a layer with a thickness of 0.5 μm or more to 5 μm or less formed by using melamine-based resin, silicon-based resin or the like. The surface protective layer 13 is a layer with a thickness of 1 μm or more to 10 μm or less formed by using ultraviolet curable resin with high hardness or the like. The primer layer 14 is a layer with a thickness of 1 μm or more to 10 μm or less formed by using polyester resin or the like.

When the decorative layer 15 is formed on the in-mold raw fabric 21, a clear layer 151 is formed by using a clear ink not affecting design expression on one layer over the in-mold raw fabric 21.

The clear layer 151 is formed to have an area larger than a printed pattern formed on a second layer above the in-mold raw fabric 21 as well as smaller than a product size of the molded article.

As the clear ink used for the clear layer 151, two-component curable ink is used, and printed ink is cured by thermal drying. A curing state is set to a state in which the ink hardly contracts with respect to thermal shrinkage of the base material film 11. Note that the curing state and the thickness of the material is set also in consideration of a certain amount of extensibility at the time of in-mold molding.

Specifically, an ink material based on acrylic resin and urethane resin is selected as the material, a curing agent is added and curing is allowed to proceed at thermal drying furnaces after printing. A solvent ratio of the ink material and a print thickness by a printing plate are set so that a thickness of the clear layer 151 after drying becomes 3 μm or more to 10 μm or less. The clear layer 151 has also an effect of stabilizing shrinkage of the base material film 11 in the in-mold raw fabric 21 in the drying furnaces 60 for allowing the curing of the ink material to proceed.

As the mold releasing layer 12 in the in-mold raw fabric 21 easily suffers damage from high-temperature drying, the drying furnaces 60 for drying the clear layer 151 do not use an excessive high temperature condition, in which the temperature is set at 60° C. to 120° C. and drying time is set to 5 minutes to 15 minutes.

In a design such as piano black, colorless and transparent ink is used as the clear ink for the clear layer 151. In a design with glitters, pearl particles may be mixed into the clear ink to form a glitter clear layer so as to correspond to the glitter design, in which colorless and transparent clear ink is used as a base, which does not affect the color of design printing patterns of the second and subsequent layers.

Concerning a boundary of the clear layer 151 on an inner side of the in-mold decorative molded article, an inner frame side of the clear layer 151 is not printed, and positional relationship assumed when the design with glitters is formed is shown in FIG. 1. As glitter particles are not put on the clear window layer 153, the clear layer 151 is printed at portions other than the clear window layer 153 in the case of the design with glitters. However, this is not applied to a case of using only the clear ink without glitters, and it is possible to form the clear layer 151 in the entire inner frame. In that case, it is also possible to form only the clear layer 151 so as to cover the entire product part of the in-mold decorative molded article without forming the clear window layer 153.

Recognition marks 160, recognition lines 161a and 161b necessary for positioning with respect to the metal mold are printed on the in-mold transfer foil 20. The recognition marks and lines fix the in-mold transfer foil 20 at a prescribed position inside the metal mold by recognition by a CCD camera or an optical sensor and by using a feeding device of the in-mold transfer foil in an injection molding machine. At this time, it is necessary to increase printing accuracy of the recognition mark 160, and the recognition lines 161a and 161b. Accordingly, the clear layer 151 is also printed at both ends in the width direction of the in-mold transfer foil 20 so as to cover regions in which the recognition marks and the recognition lines are printed. The clear layer 151 is partially printed so that the central part in which the in-mold decorative molded article is positioned and both end parts in which the recognition marks and the recognition lines are positioned are not connected.

On the second layer above the in-mold raw fabric 21, the surface black frame layer 152 as a primary design of the in-mold decorative molded article is printed. The surface black frame layer 152 is printed and formed so as to be positioned on an inner side of the clear layer 151 as the first layer. As a position of a black frame requires the most important positional accuracy in formation of the in-mold decorative molded article, a screen printing plate 63 forming the surface black frame layer 152 is formed so that the recognition marks 160, and the recognition lines 161a and 161b can be simultaneously printed. When using the same plate as described above, the surface black frame layer 152 can be formed with high accuracy in relative positions between the black frame and the recognition marks/the recognition lines.

As for the ink for the surface black frame layer 152, the two-component curable ink having the similar resin components as the clear ink of the clear layer 151 as the first layer is used, and curing is allowed to proceed by thermal drying after printing. As the layers are formed of the same ink components, interlayer adhesiveness of the clear layer 151 and the surface black frame layer 152 can be increased.

The clear window layer 153 as the third layer and the concealed layer 154 as the fourth layer above the in-mold raw fabric 21 are also formed of the same ink components in the same manner, these layers are formed so as to be positioned on the inner side of the clear layer 151 as the first layer. Although the clear window layer 153 is formed so as to cover a larger area than the surface black frame layer 152 does in FIG. 1, a portion requiring the clear window layer 153 is preferably larger than an inner frame boundary of the black frame, therefore, in a positional relationship at a boundary between the outer side of the surface black frame layer 152 and the outer side of the clear window layer 153, either of them may be positioned on the outer side.

Figure 8A:
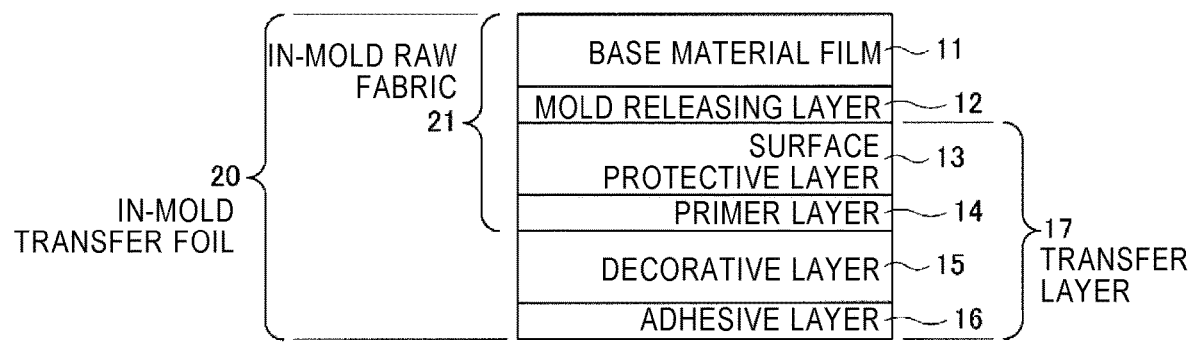
FIG. 8A is a cross-sectional view of an in-mold transfer foil and FIG. 8B is a cross-sectional view of an in-mold decorative molded article decorated by a transfer layer on the outermost surface described in JP-A-2011-213022.
Figure 8B:
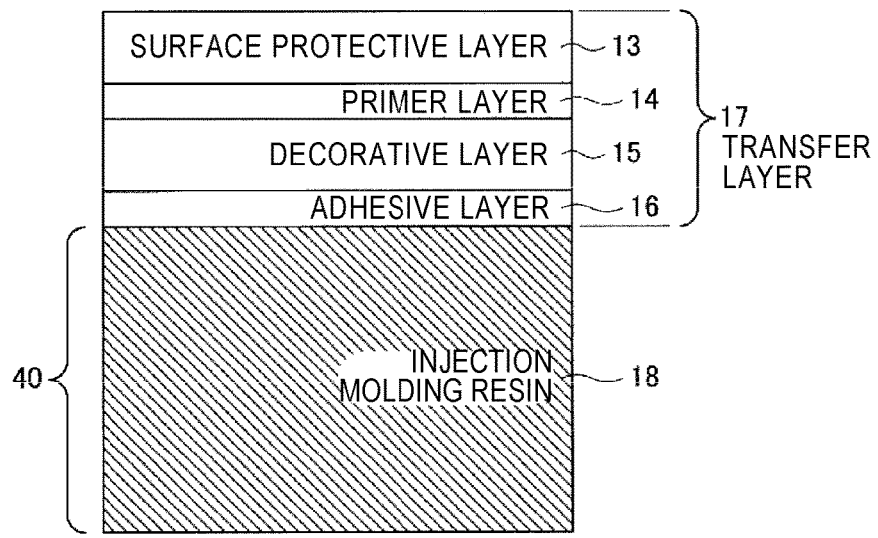
Figure 9:
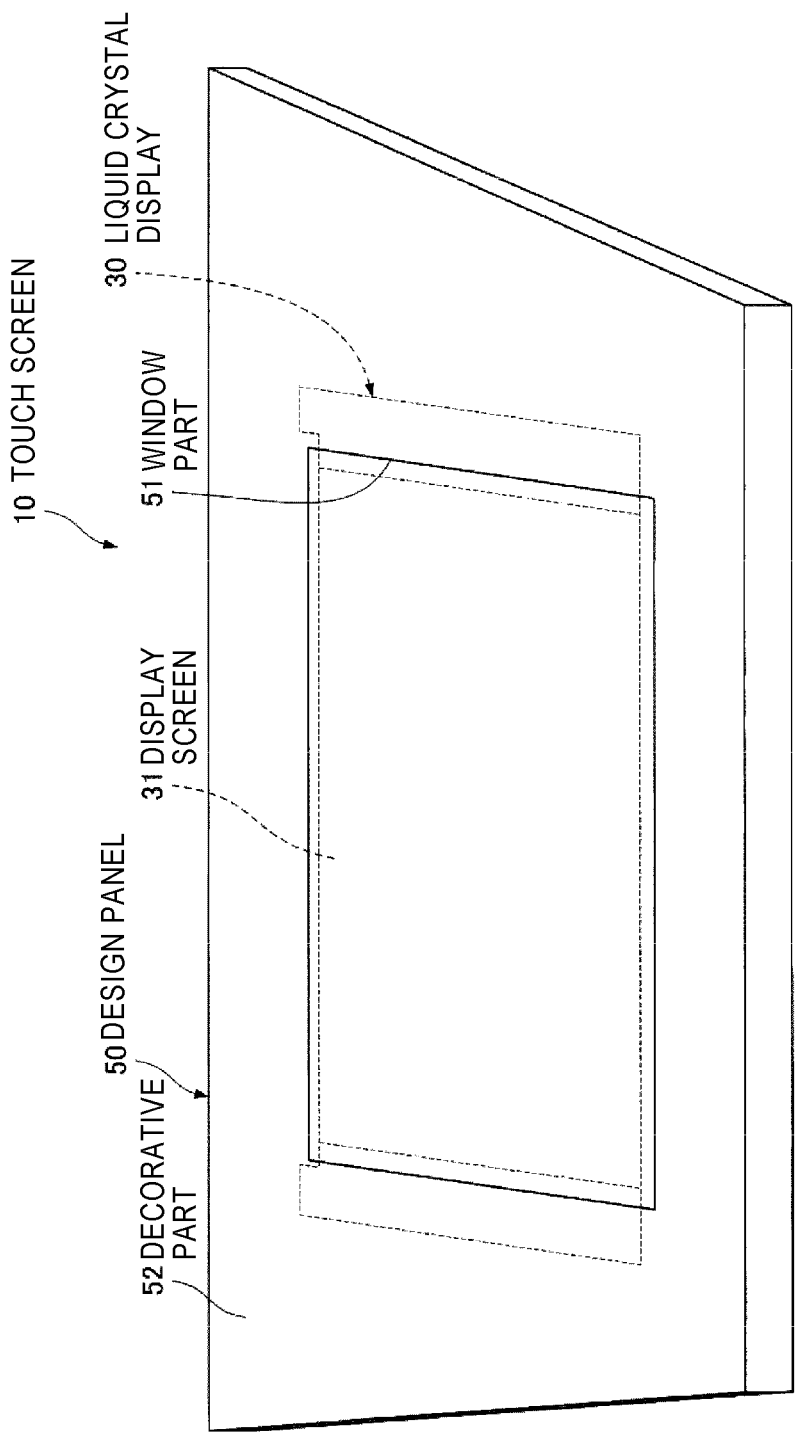
FIG. 9 shows a perspective view of a design panel for a display device described in JP-A-2015-058655.

As an adhesive layer 155 (the adhesive layer 16 in FIGS. 8A-8B) as the fifth layer above the in-mold raw fabric 21 has a role of holding adhesiveness with respect to the molding resin of the in-mold decorative molded article at the time of molding, the material is selected according to resin components or molding conditions of the in-mold decorative molded article. As the poly carbonate (PC) resin is used as the injection molding resin 18 for the cover lens and the like, high adhesiveness with respect to the resin and transparency of a transparent window part are necessary, therefore, the adhesive layer 155 is formed by using an adhesive material having transparency. As the adhesiveness with respect to the molding resin is necessary, one-component curable material is normally used. This is because the adhesiveness with respect to the molding resin is not increased when using a material with high degree of curing such as two-component material. The adhesive layer 155 is also formed on the inner side of the clear layer 151 as the first layer, however, in a positional relationship between an outer end part of the clear layer 151 and an outer end part of the adhesive layer 155, either of them may be positioned on the outer side as far as the adhesive layer 155 is larger than the boundary of the product part of the in-mold decorative molded article and positioned on the inner side of an end portion including a cutting portion 53 of the molded article 40.

Figure 3:
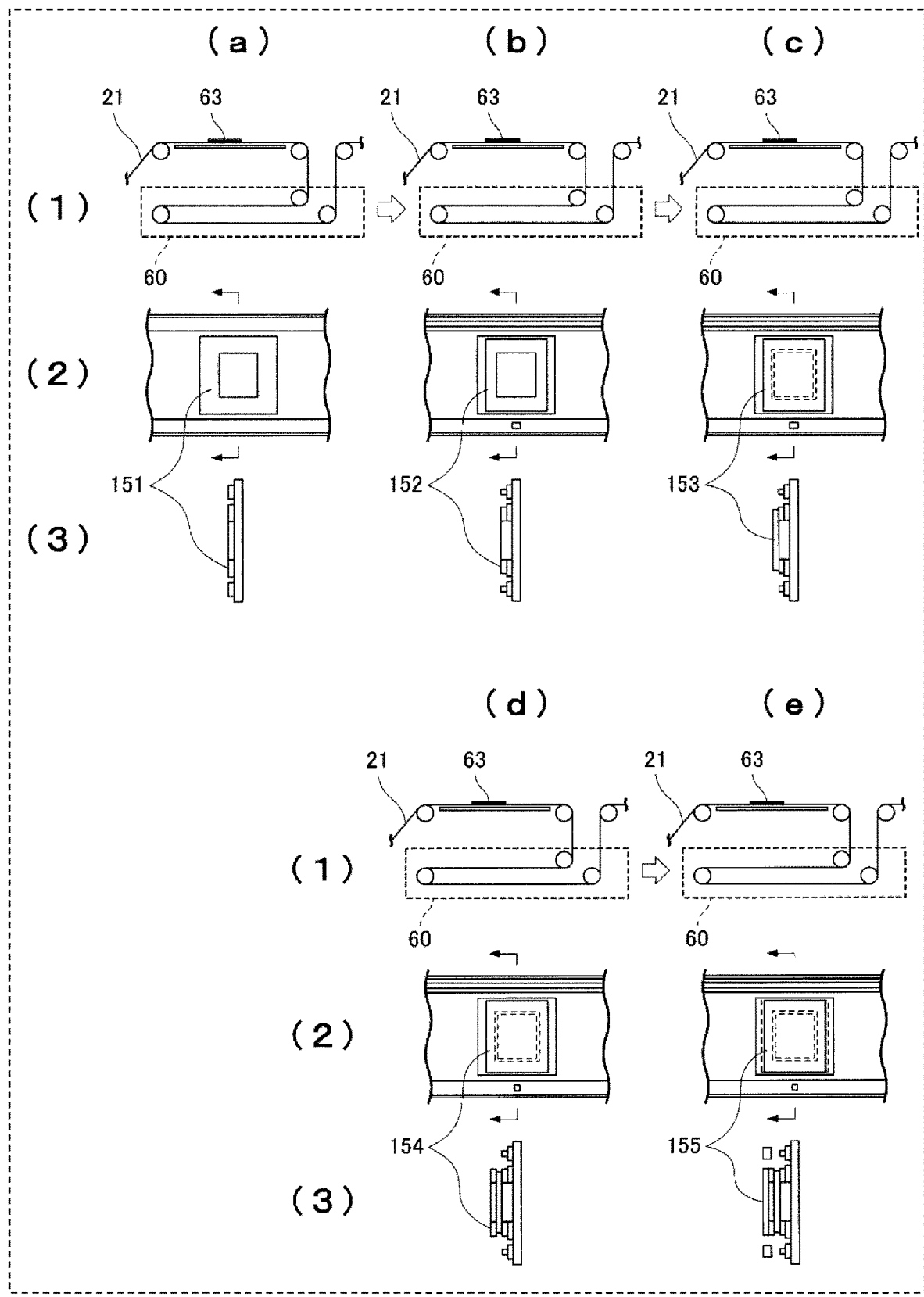
FIG. 3 is a manufacturing process view of the in-mold transfer foil used for the method of manufacturing the in-mold decorative molded article according to the present disclosure.

As shown in FIG. 3, (a) to (e) show manufacturing processes of the in-mold transfer foil 20.

In FIG. 3, manufacturing is performed by using screen printing processes. Screen printing equipment has units performing printing and thermal drying layer by layer in a roll-to-roll system, and it is also preferable to adopt equipment in which a plurality of units for forming respective layers are connected.

The in-mold raw fabric 21 is conveyed to a printing stage, respective layers are printed by the screen printing plate 63 and respective ink layers are dried and cured at the drying furnace 60.

The clear layer 151 is formed as the first layer on the in-mold raw fabric 21 and is thermally dried to thereby stabilize the initial thermal shrinkage state of the in-mold raw fabric. When the surface black frame layer 152 on the second and subsequent layers above the in-mold raw fabric 21 is formed in a state where the clear layer 151 is stably cured, printing dimensions of the black frame becomes stable even after the clear window layer 153, the concealed layer 154 and the adhesive layer 155 are formed.

As the conveying speed and drying conditions can be changed in respective layers by using the screen printing equipment, the thermal shrinkage state of the in-mold raw fabric 21 can be easily stabilized particularly at the time of forming the clear layer 151 as the first layer. As the printed regions of the clear layer 151 at the time of formation are partially formed, effects due to shrinkage in the in-mold raw fabric at regions requiring accuracy in printing dimensions of the surface black layer 152 of the second and subsequent layers can be reduced.

The in-mold decorative molding using the in-mold transfer foil 20 is executed in the same processes as those in FIGS. 7A to 7D. Positional relationship between the metal mold and the in-mold transfer foil at the processes is shown in FIG. 4 and FIG. 5.

Figure 4:
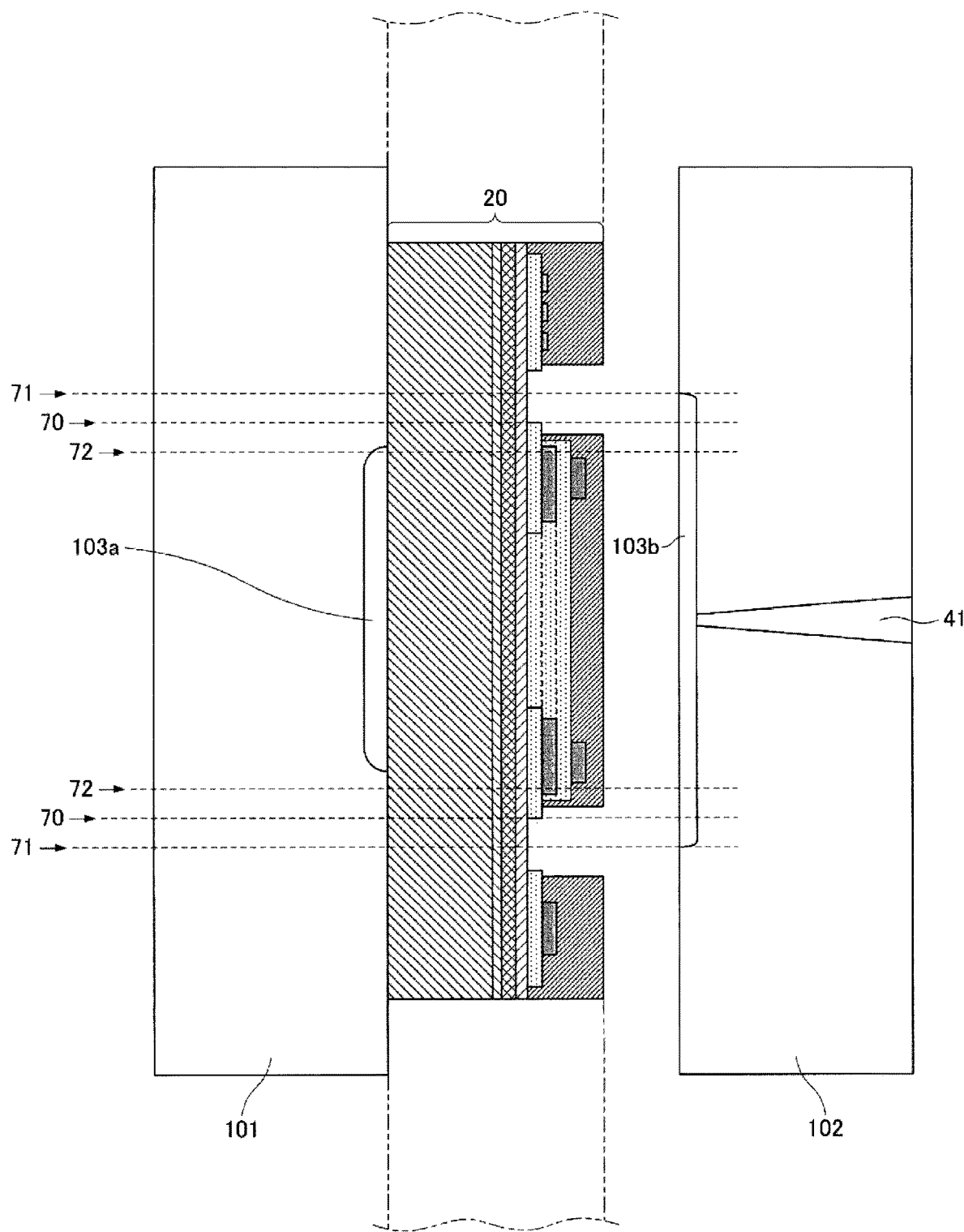
FIG. 4 is a cross-sectional view showing positional relationship between a metal mold and the in-mold transfer foil used for the method of manufacturing the in-mold decorative molded article according to the present disclosure.
Figure 5:
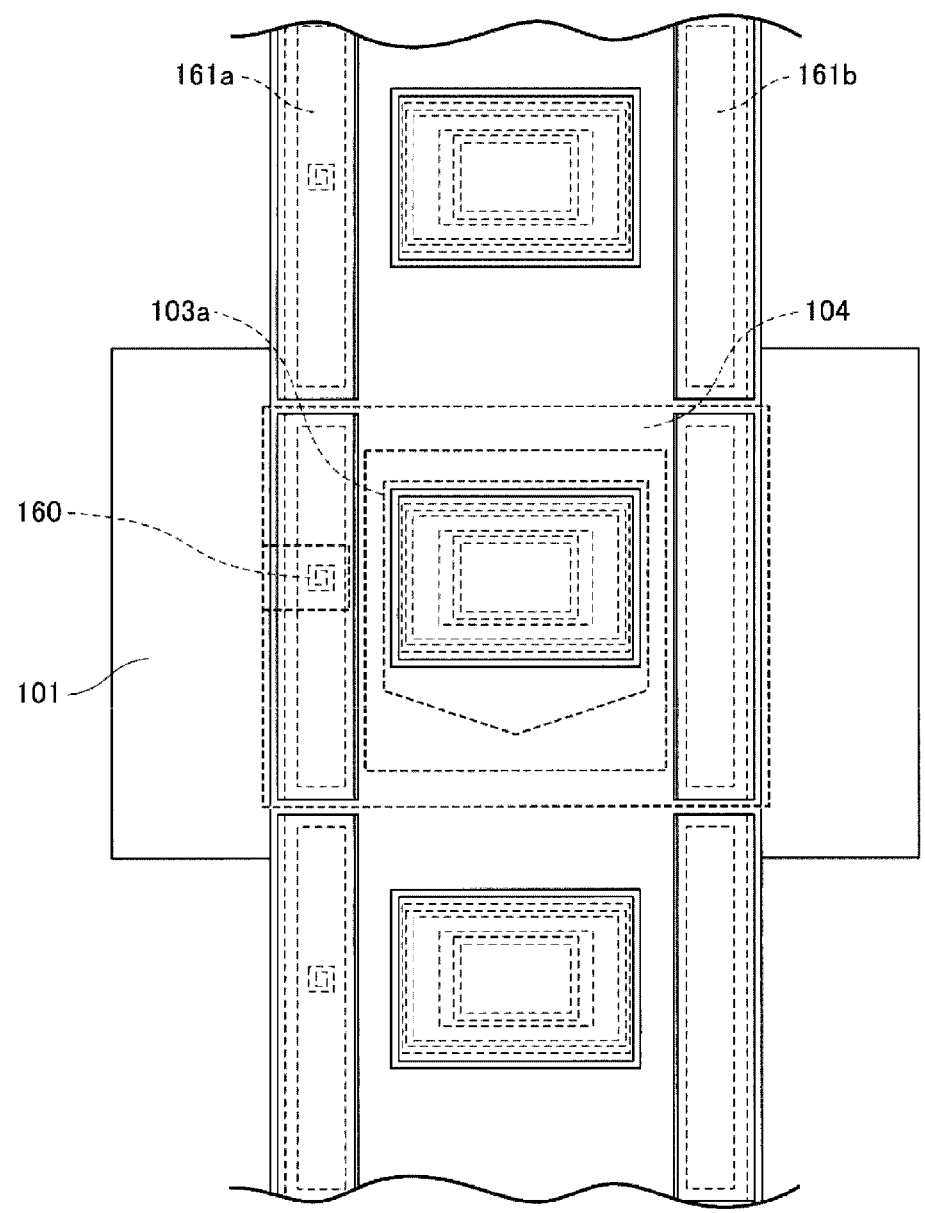
FIG. 5 is a front view of FIG. 4.

In FIG. 4, a broken line 70 represents a boundary of the clear layer 151 positioned on the product's side in the in-mold transfer foil 20 with respect to cavities 103a and 103b of the movable mold 101 and the fixed mold 102. A broken line 71 represents an end portion of the molded article 40. A broken line 72 represents a position of a portion to be an end portion after the cutting portion 53 (see FIG. 6) of the molded article 40 is removed.

In FIG. 4, respective layers of the in-mold transfer foil 20 are shown in an enlarged state so that positional relationship between respective layers of the in-mold transfer foil 20 and respective parts of the metal mold can be clearly seen, therefore, relative dimensions with respect to respective parts of the metal mold differ.

Thicknesses of cavity spaces of the metal mold in cross section are 1 to 5 mm, whereas the thickness of the in-mold transfer foil 20 is 20 to 200 μm.

Figure 6:
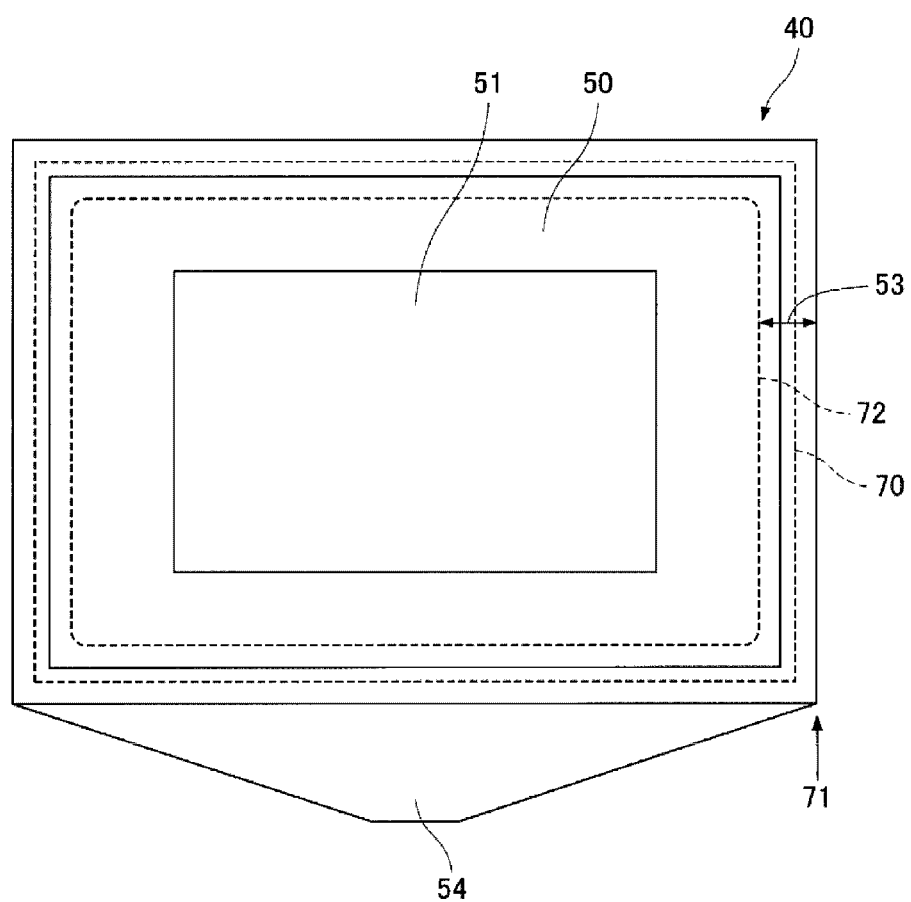
FIG. 6 is a front view of the in-mold decorative molded article taken out from the metal mold.

The molded article 40 taken out after injection molding by using the in-mold transfer foil 20 is shown in FIG. 6. FIG. 6 shows positional relationship between respective portions in the molded article 40 taken out from the metal mold and respective portions of the in-mold transfer foil 20.

In the molded article 40, a gate portion 54 and the cutting portion 53 are integrally formed on an outer periphery of the design panel 50 as a target product as shown in FIG. 6. The design panel 50 has a shape obtained by removing the gate portion 54 and the cutting portion 53 by cutting processing along the broken line 72 as secondary processing. That is, positions of the broken line 72 will be the end portion of the product part. The cutting processing is performed by machining in many cases, but laser processing or removal processing by using a cutter or a knife may be adopted.

Accordingly, the in-mold transfer foil 20 is arranged on the metal mold while the position is controlled so that the boundary 70 of the clear layer 151 in the in-mold transfer foil 20 is positioned between the end portion 71 of the cutting portion 53 as the end portion of the molded article 40 and the end portion 72 of the design panel 50 obtained after removing the cutting portion 53 as shown in FIG. 4.

In FIG. 5, the recognition marks 160, and the recognition lines 161a and 161b are printed on both ends in the width direction of the in-mold transfer foil 20. The in-mold transfer foil 20 is controlled to be set at a prescribed position by recognizing the recognition marks 160 by a CCD camera installed on the outside of the metal mold. On the other hand, the in-mold transfer foil 20 is controlled by an in-mold transfer foil feeding device by recognizing the recognition lines 161a and 161b by optical sensors arranged above and below on the outside of the metal mold so that an inclined state of the in-mold transfer foil 20 is in a prescribed state. After the in-mold transfer foil 20 is installed in the prescribed position, the in-mold transfer foil 20 is restricted by the clamp frame body 104. At this time, the accuracy of relative positions of the surface black frame layer 152 in the in-mold transfer foil 20 with respect to the product cavity space 103 inside the metal mold becomes important first. The positional accuracy of the surface black frame layer 152 is determined by distance dimensions with respect to the recognition marks 160 and the inclination accuracy at the time of setting the in-mold transfer foil 20. As the recognition marks 160 are formed by the same plate as the surface black frame layer 152, variation at the time of printing is small, and even when there is film shrinkage when the ink is cured and dried at the time of printing, the recognition marks 160 can be set at almost constant positions by setting installation position conditions of the recognition marks 160 in the in-mold transfer foil feeding device as far as the shrinkage amount of the in-mold raw fabric 21 is almost constant in the same roll. It is not applied to a case where there is shrinkage or slack at end portions of the in-mold transfer foil 20, and there is no guarantee that the surface black frame layer 152 is installed at a right position even when positions of the recognition marks 160 are correct. Accordingly, the effect of the curing state of the clear layer in a state before the recognition marks 160 are printed becomes effective from the viewpoint of preventing shrinkage or slack at the end portion of the in-mold transfer foil 20. When the recognition line 161a in a black band is formed also around the recognition mark 160, shrinkage or slack can be further prevented. The same applies to formation of the recognition lines 161b, and the effect of the curing state of the clear layer in the state before the recognition lines are printed becomes effective.

Incidentally, the end portion of the product is normally processed to be an arc shape (rounding processing) by rounding corners and the like in many cases for preventing a cut in a human body due to an edge. When the cutting portion 53 is provided at the end portion, the product has a shape falling into the cavity space by the rounding processing. Therefore, the in-mold transfer foil 20 is pulled into the cavity space and stretches by that space. In the case where thicknesses of the transfer layer in the in-mold transfer foil 20 positioned in the product part between the rounding processed portion at the end portion of the product and the end portion of the product are the same, the force generated in the in-mold transfer foil 20 is received almost uniformly when the in-mold transfer foil 20 is pulled. However, a stretching state of the surface black frame layer 152 tends to vary due to variation in thickness of respective formed layers, variation in temperature on the metal mold and variation in the restricted state. That is, as in the in-mold transfer foil 20 according to the present disclosure, the clear layer 151 and the printing layer with respective decorations are formed only in the transfer layer 17 positioned in the product part in the cavity space, and a thin portion formed of only the in-mold raw fabric 21 is allowed to remain between the product end portion 72 and the end portion 71 of the molded article 40 with the cutting portion 53 so that the portion of the in-mold transfer foil 20 which stretches easily is allowed to be positioned at the cutting portion 53 not relating to decoration, thereby largely reducing influence to deformation of the decorative pattern in the product part.

As described above, the clear layer is formed as the first layer on the in-mold raw fabric 21, the two-component curable ink is used as the ink layer with a thickness in which thermal shrinkage is reduced to be lower than the raw film, the ink layer is printed on the region larger than the area of the decorative pattern on the second layer and regions on both end portions of the in-mold transfer foil, printing is not performed on the entire surface but a region without printing is included, the region for releasing shrinkage of the raw fabric is included, the region stretched at the time of being sucked into the metal mold is included, the transparent printing part is printed in the smaller region than the size of the molded article, the sufficient thermal drying process is performed after forming the first layer and the frame pattern requiring highly accurate dimensions as the design is formed in the second layer.

According to the structure of the present embodiment, the in-mold transfer foil capable of printing the design with highly-accurate printing dimensions can be manufactured, and the in-mold decorative molded article having the design printing with highly accurate dimensions can be manufactured. In particular, in the case where the in-mold decorative molded article is a cover lens molded article in which the frame pattern as the decorative pattern surrounds a periphery of the display screen of the display, a clearance between the screen display part and the frame end portion of the decorative part can be minimized, therefore, the design panel for the display device having high designability in which the screen display part and the decorative part are seamlessly connected can be manufactured. In the above embodiment, the in-mold raw fabric 21 is configured by forming the mold releasing layer 12, the surface protective layer 13 and the primer layer 14 are formed on the base material film 11, however, the present disclosure can be achieved also in an in-mold raw fabric 21 not including the surface protective layer 13.

In the above embodiment, the case of the design panel for the display device in which the frame pattern as the decorative pattern surrounds the periphery of the display screen of the display has been explained as an example, and the present disclosure is effective also in a case of an in-mold decorative molded article in which it is necessary to transfer a figure or a design pattern requiring high positioning accuracy without distortion with high accuracy such as in an operation character section.

The present disclosure contributes to various types of external decorative molded articles such as an in-vehicle display cover lens having a highly accurate black frame design and a manufacturing technique thereof.

What is claimed is:

1. A method of manufacturing an in-mold molded article, the method comprising:
   supplying an in-mold transfer foil to a metal mold, the in-mold transfer foil including a clear layer formed in a first layer on an in-mold raw fabric that is configured by forming a mold releasing layer and a primer layer on a base material film, the clear layer having transparency and lower extensibility than the base material film, and a pattern is printed in second and subsequent layers on the in-mold raw fabric;
   clamping the metal mold, injecting and cooling a molding resin, and taking out a molded article formed of the molding resin that has cooled and cured in the metal mold, wherein the clear layer and a transfer layer having the pattern in the in-mold transfer foil are integrated on a surface of the molded article by opening the mold;
   molding the molded article integrally with a cutting portion inside the metal mold by the molding resin at an outer periphery of a target product, wherein the cutting portion is not necessary for the product; and
   arranging a boundary of a printing region of the clear layer in the in-mold transfer foil in the cutting portion so as to be larger than the outer periphery of the product.

2. A method of manufacturing an in-mold molded article, the method comprising:
   forming an in-mold transfer foil in which a clear layer is formed in a first layer on an in-mold raw fabric that is configured by forming a mold releasing layer and a primer layer on a base material film,
   wherein the clear layer is formed by using curable ink, and, in second and subsequent layers on the in-mold raw fabric, a layer in which a frame pattern is formed, a non-printing region is included, and all printing layers necessary for design expression are formed,
   wherein the second and subsequent layers are printed in a smaller region than a size of the molded article;
   forming a cutting portion larger than a product size in an outer peripheral portion of the molded article so as to be larger than a printing region of the layer in which the frame pattern is formed so as to obtain a product shape by cutting; and arranging the layer in which the frame pattern is formed so that a boundary of the printing region is positioned in the cutting portion.

3. The method of manufacturing the in-mold molded article according to claim 2, wherein the in-mold transfer foil is formed by a screen printing method.

4. The method of manufacturing the in-mold molded article according to claim 2, further comprising:
forming the clear layer also in regions including recognition marks and recognition lines provided in the in-mold transfer foil for positioning control between the metal mold and the in-mold transfer foil.

5. The method of manufacturing the in-mold molded article according to claim 2, further comprising:
forming recognition marks and recognition lines in the in-mold transfer foil in the second and subsequent layers on the in-mold raw fabric for positioning control between the metal mold and the in-mold transfer foil.

\* \* \* \* \*